United States Patent
Jung et al.

(10) Patent No.: US 10,863,573 B2
(45) Date of Patent: *Dec. 8, 2020

(54) METHOD AND APPARATUS FOR SEQUENTIAL FORWARDING CONSIDERING MULTI-FLOW IN DUAL CONNECTIVITY SYSTEM

(71) Applicant: Pantech Corporation, Seoul (KR)

(72) Inventors: Myung Cheul Jung, Seoul (KR); Kang Suk Huh, Seoul (KR); Jae Hyun Ahn, Seoul (KR); Ki Bum Kwon, Seoul (KR)

(73) Assignee: PANTECH CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,626

(22) Filed: Mar. 26, 2018

(65) Prior Publication Data
US 2018/0213592 A1      Jul. 26, 2018

Related U.S. Application Data

(63) Continuation of application No. 14/890,407, filed as application No. PCT/KR2014/004189 on May 9, 2014, now Pat. No. 9,930,720.

(30) Foreign Application Priority Data

May 10, 2013   (KR) ........................ 10-2013-0053408

(51) Int. Cl.
*H04W 76/27* (2018.01)
*H04W 76/15* (2018.01)
(Continued)

(52) U.S. Cl.
CPC .......... *H04W 76/27* (2018.02); *H04B 7/2612* (2013.01); *H04L 5/00* (2013.01);
(Continued)

(58) Field of Classification Search
CPC ..... H04W 76/27; H04W 76/15; H04W 48/20; H04W 76/00; H04W 16/32; H04W 84/045; H04L 47/34; H04L 5/00; H04B 7/2612

See application file for complete search history.

(56) References Cited

U.S. PATENT DOCUMENTS

2004/0151154 A1    8/2004  Wu
2009/0190554 A1    7/2009  Cho
(Continued)

FOREIGN PATENT DOCUMENTS

JP      2003-283592     10/2003
JP      2013-062882      4/2013
(Continued)

OTHER PUBLICATIONS

International Search Report dated Aug. 14, 2014, in International Patent Application No. PCT/KR2014/004189.
(Continued)

*Primary Examiner* — Andrew Lai
*Assistant Examiner* — Harry H Kim
(74) *Attorney, Agent, or Firm* — Capitol IP Law Group, PLLC

(57) ABSTRACT

The present invention provides a method for user equipment receiving multi-flow data with respect to one evolved packet system (EPS) bearer through a macro base station (macro eNB) and a small base station (small eNB) in a wireless communication system supporting dual connectivity. The method comprises the steps of: a packet data convergence protocol (PDCP) entity of the user equipment receiving
(Continued)

PDCP packet data units (PDU) through the macro base station and the small base station from a PDCP entity of the macro base station; obtaining PDCP service data units (SDU) corresponding to PDCP PDUs; and receiving from the macro base station information related to a sequence timer for the PDCP SDUs through a radio resource control (RRC) message, wherein the PDCP SDUs are indicated by a predefined PDCP sequence number (SN).

12 Claims, 15 Drawing Sheets

(51) Int. Cl.
```
H04W 76/00      (2018.01)
H04W 48/20      (2009.01)
H04W 84/04      (2009.01)
H04W 16/32      (2009.01)
H04B 7/26       (2006.01)
H04L 5/00       (2006.01)
H04L 12/801     (2013.01)
```

(52) U.S. Cl.
CPC ............. *H04L 47/34* (2013.01); *H04W 48/20* (2013.01); *H04W 76/00* (2013.01); *H04W 76/15* (2018.02); *H04W 16/32* (2013.01); *H04W 84/045* (2013.01)

(56) References Cited

U.S. PATENT DOCUMENTS

| | | | |
|---|---|---|---|
| 2009/0323663 A1 | 12/2009 | Nakatsugawa | |
| 2010/0039996 A1 | 2/2010 | Ohta et al. | |
| 2010/0046448 A1* | 2/2010 | Peisa | H04W 28/065 370/329 |
| 2010/0304733 A1* | 12/2010 | Yi | H04L 1/188 455/422.1 |
| 2011/0188377 A1 | 8/2011 | Kim et al. | |
| 2011/0199998 A1 | 8/2011 | Yi et al. | |
| 2011/0286387 A1 | 11/2011 | Sane et al. | |
| 2012/0039226 A1 | 2/2012 | Yang et al. | |
| 2012/0069750 A1 | 3/2012 | Xing et al. | |
| 2012/0182971 A1* | 7/2012 | Ohta | H04W 36/023 370/331 |
| 2012/0294281 A1 | 11/2012 | Park | |
| 2015/0215827 A1* | 7/2015 | Zhang | H04W 28/0247 370/331 |
| 2015/0373559 A1* | 12/2015 | Hong | H04W 52/0206 370/329 |

FOREIGN PATENT DOCUMENTS

| | | |
|---|---|---|
| JP | 2013-062884 | 4/2013 |
| KR | 10-2010-0005017 | 1/2010 |
| KR | 10-2012-0128078 | 11/2012 |

OTHER PUBLICATIONS

R2-070130, "Selective forwarding/retransmission during HO"; 3GPP TSG-RAN2 Meeting #56bis; Discussion and decision Agenda Item: 5.2.6, (R2-070130 hereinafter) was published Jan. 15-Jan. 19, 2007.
Non-Final Office Action dated Jul. 19, 2017 in U.S. Appl. No. 14/890,407.
Notice of Allowance dated Nov. 9, 2017 in U.S. Appl. No. 14/890,407.

* cited by examiner

METHOD AND APPARATUS FOR SEQUENTIAL FORWARDING CONSIDERING MULTI-FLOW IN DUAL CONNECTIVITY SYSTEM

CROSS-REFERENCE TO RELATED APPLICATIONS

This application is a Continuation of U.S. patent application Ser. No. 14/890,407, filed on Nov. 10, 2015, which is a National Stage of International Application No. PCT/KR2014/004189, filed on May 9, 2014, and claims priority from and the benefit of Korean Patent Application No. 10-2013-0053408, filed on May 10, 2013, each of which is hereby incorporated by reference for all purposes as if fully set forth herein.

BACKGROUND

Field

The present invention relates to wireless communication, and more particularly, to a method and an apparatus of in-sequence delivery considering a multi-flow in a wireless communication system supporting dual connectivity.

Discussion of the Background

Particularly many communication demands are generated in a specific area such as a hotspot in a cell and receiving sensitivity of radio waves may deteriorate in a specific area such as a cell edge or a coverage hole. With the development of wireless communication technology, small cells, for example, a pico cell, a femto cell, a micro cell, a remote radio head (RRH), a relay, a repeater, and the like are together installed in a macro cell for the purpose of enabling communication in areas such as the hot spot, the cell edge, and the coverage hole. Such a network is called a heterogeneous network (HetNet). In a heterogeneous network environment, relatively, the macro cell is a cell having large coverage and the small cells such as the femto cell and the pico cell are cells having small coverage. Since the small cells such as the femto cell and the pico cell use lower power than the macro cell, the network is also referred to as a low power network (LPN). In the heterogeneous network environment, coverages of multiple macro cells and small cells overlap with each other.

User Equipment (UE) can perform wireless communication through two or more base stations among base stations constituting at least one serving cell. This is referred to as dual connectivity and a wireless communication system supporting the dual connectivity is referred to as a dual connectivity system. In this case, one of a plurality of base stations physically or logically divided, which constitute the dual connectivity may be a macro base station (alternatively, an anchorage station) and the other one may be a small base station (alternatively, an assisting base station). The UE may be 'dually connectable UE' in which dual connectivity is possible and 'dually inconnectable UE' in which dual connection supporting is impossible.

The macro base station manages data flow control, security, and header compression according to a packet data convergence protocol (PDCP) for data transmitted to the small base station through a radio bearer (RB).

In general, the wireless communication system is a single flow structure in which a service is provided to the UE through one RB for one EPS bearer service. However, in the case of the wireless communication system supporting the dual connectivity, the service of one EPS bearer can be provided to the UE through not one RB but two RBs established in the macro cell and the small cell, respectively. That is, the service can be provided to the UE through multi-flows.

In the case of an acknowledged mode (RLC AM), an RLC entity of the UE reorders RLC packet data units (PDUs) when received RLC PDUs are received out of the order in a downlink. In the case of the RLC AM, a transmitting side can retransmit an RLC PDU of which receiving is missed at a receiving side again. The RLC entity reassembles an RLC service data unit (SDU) based on the reordered RLC PDU and sequentially the reassembled RLC SDU to an upper layer (that is, PDCP entity). In the case of the RLC AM, the RLC PDUs can be sequentially delivered through reordering and retransmission methods of the RLC PDUs. In other words, the PDCP entity needs to be sequentially delivered with the RLC SDUs except for reestablishment of the lower layer. However, in the case of the UE in which the multi-flows are constituted, the RLC entity for the small base station and the RLC entity for the macro base station are distinguished to receive the respective RLC SDUs and acquire the PDCP SDU and deliver the acquired PDCP SDU to the upper layer and in this case, the PDCP entity cannot sequentially acquire the PDCP SDUs. Accordingly, in the case of the UE using the multi-flows, a new method for sequential delivery of the PDCP SDUs to the upper layer in the PDCP entity is required.

SUMMARY

The present invention provides a method and an apparatus of in-sequence delivery considering multi-flows in a dual connectivity system.

The present invention also provides a method and an apparatus in which a PDCP entity at a UE end delivers PDCP SDUs to an upper layer in sequence in a multi-flow structure.

The present invention also provides configuring a sequential delivery timer in UE in a multi-flow structure.

In one aspect, a method for user equipment receiving multi-flow data with respect to one evolved packet system (EPS) bearer through a macro base station (macro Evolved NodeB (eNB)) and a small base station (small eNB) in a wireless communication system supporting dual connectivity is provided. The method includes: receiving packet data convergence protocol (PDCP) packet data units (PDUs) through the macro base station and the small base station; obtaining PDCP service data units (SDUs) corresponding to the PDCP PDUs; and receiving from the macro base station information related to an in-sequence timer for the PDCP SDUs through a radio resource control (RRC) message, wherein the PDCP SDUs are indicated by a predefined PDCP sequence number (SN).

In another aspect, a method for transmitting multi-flow data for one EPS bearer to UE from a macro base station through the macro base station and a small base station in a wireless communication system supporting dual connectivity is provided. The method includes: generating PDCP PDUs in a PDCP entity with respect to packets received by the macro base station according to a PDCP SN of a PDCP SDU; distributing the PDCP PDUs to radio link control (RLC) entities of the macro base station and RLC entities of the small base station according to a predetermined rule and transmitting the distributed PDCP PDUs to the UE; and transmitting to the UE an RRC message including information related to an in-sequence timer for the PDCP SDUs.

In yet another aspect, UE for receiving multi-flow data with respect to one evolved packet system (EPS) bearer through a macro base station (macro eNB) and a small base station (small eNB) in a wireless communication system supporting dual connectivity is provided. The UE includes: a receiving unit receiving packet data convergence protocol (PDCP) packet data units (PDUs) through the macro base station and the small base station and receiving from the macro base station information related to an in-sequence timer for the PDCP SDUs through a radio resource control (RRC) message; and a processor obtaining PDCP service data units (SDUs) corresponding to the PDCP PDUs, wherein the PDCP SDUs are indicated by a predefined PDCP sequence number (SN).

According to the present invention, in performing downlink transmission through multi flows in a dual connectivity system, even though a PDCP entity of UE non-sequentially receives PDCP PDUs, PDCP SDUs can be delivered to an upper layer in sequence and transmission efficiency can be improved.

DETAILED DESCRIPTION OF THE ILLUSTRATED EMBODIMENTS

Figure 1:
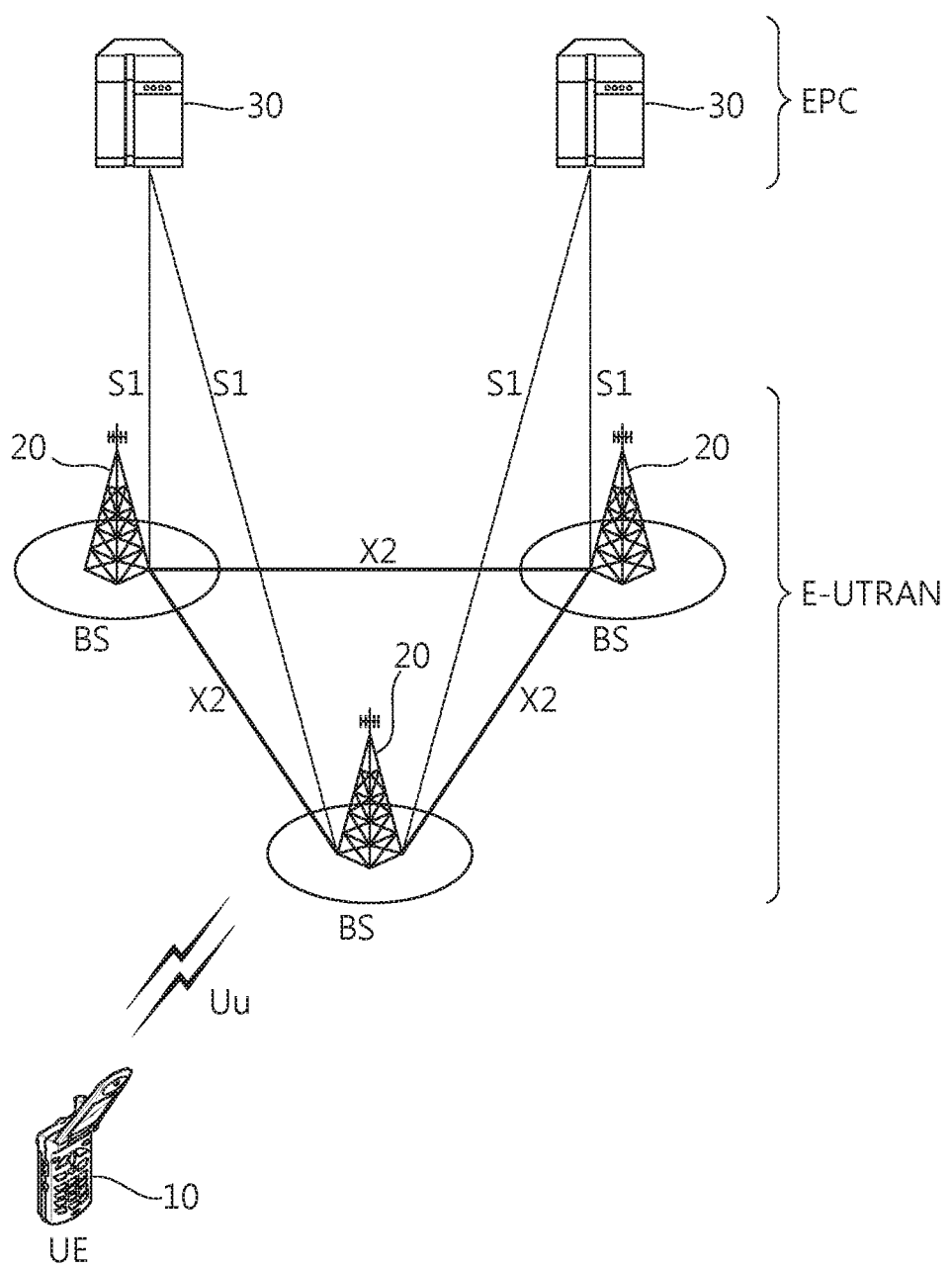
FIG. 1 illustrates a wireless communication system according to the present invention.

Hereinafter, in the specification, contents associated with the present invention will be described in detail through illustrated drawings and embodiments together with contents of the present invention. In the figures, even though the parts are illustrated in different drawings, it should be understood that like reference numbers refer to the same or equivalent parts of the present invention throughout the several figures of the drawing. In describing the embodiments of the present invention, when it is determined that the detailed description of the known art related to the present invention may obscure the gist of the present invention, the detailed description thereof will be omitted.

Further, a wireless communication network is described as target in the specification, and a work performed in the wireless communication network may be performed while a system (for example, a base station) that controls the corresponding wireless communication network controls the network and transmits data, or the work may be performed by UE coupled with the corresponding wireless network.

FIG. 1 illustrates a wireless communication system according to the present invention. This may be a network architecture of an evolved-universal mobile telecommunications system (E-UMTS). The E-UMTS may be called a long term evolution (LTE) or LTE-A (advanced) system. The wireless communication system may use various multiple access techniques, such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, and OFDM-CDMA.

Referring to FIG. 1, the E-UTRAN includes an evolved NodeB (eNB) 20 that provides a control plane (CP) and a user plane (UP) to user equipment (UE) 10.

The UE 10 may be fixed or movable and may be called other terms such as a mobile station (MS), an advanced MS (AMS), a user terminal (UT), a subscriber station (SS), a wireless device, and the like.

The eNB 20 generally indicates a station that communicates with the UE 10, and may be called other terms such as a base station (BS), a base transceiver system (BTS), an access point, a femto-eNB, a pico_eNB, a home eNB, a relay, and the like. The eNBs 20 may be connected to each other through an X2 interface. The eNB 20 is connected with an evolved packet core (EPC) 30 through an S1 interface, more particularly, a mobility management entity (MME) through an S1-MME and a serving gateway (S-GW) through an S1-U. The S1 interface transmits and receives operation and management (OAM) information for supporting movement of the UE 10 by exchanging a signal with the MME.

The EPC 30 includes the MME, the S-GW, and a packet data network gateway (P-GW). The MME has access information of the UE 10 or information on capability of the UE 10, and the information is primarily used for mobility management of the UE 10. The S-GW is a gateway having the E-UTRAN as an end point and the P-GW is a gateway having the PDN as the end point.

The E-UTRAN and the EPC 30 are integrated to be called an evolved packet system (EPS) and a traffic flow from a wireless link through which the UE 10 is connected to the eNB 20 to the PDN connected to a service entity operates based an Internet protocol (IP).

A radio interface between the UE and the eNB is referred to as a Uu interface. Layers of a radio interface protocol between the UE and the eNB may be divided into a first layer L1, a second layer L2, and a third layer L3 based on three lower layers of an open system interconnection (OSI) reference model which is widely known in a communication system. Among the layers, a physical layer which belongs to the first layer provides an information transfer service using a physical channel and a radio resource control (RRC) layer positioned at the third layer controls a radio resource between the UE and the network by exchanging an RRC message.

Figure 2:
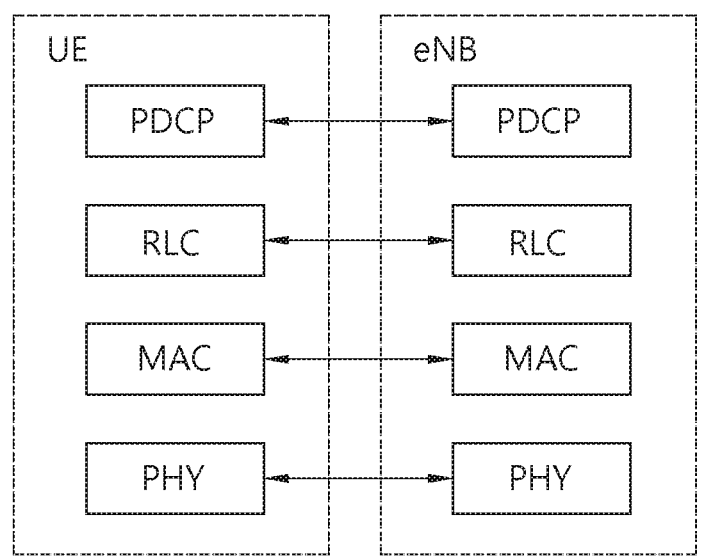
FIG. 2 is a block diagram illustrating a radio protocol architecture for a user plane.
Figure 3:
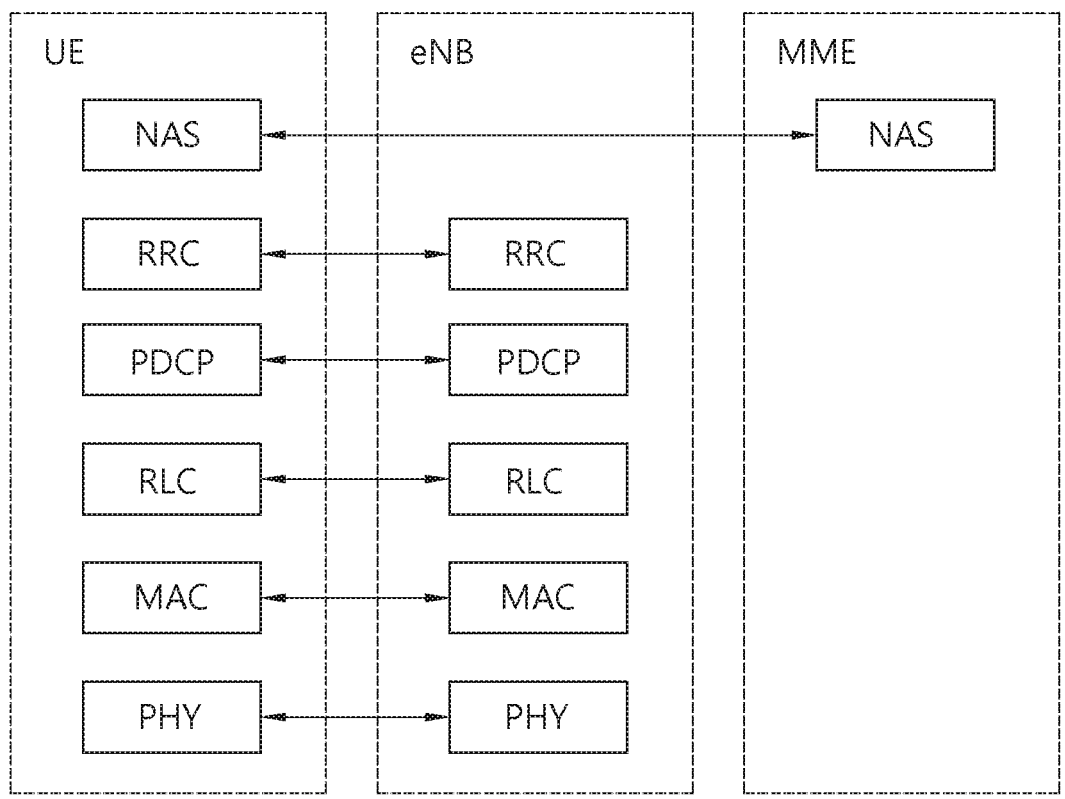
FIG. 3 is a block diagram illustrating a radio protocol architecture for a control plane.

FIG. 2 is a block diagram illustrating a radio protocol architecture for a user plane and FIG. 3 is a block diagram illustrating a radio protocol architecture for a control plane. The user plane is a protocol stack for transmitting user data and the control plane is a protocol stack for transmitting a control signal.

Referring to FIGS. 2 and 3, a physical (PHY) layer provides information transfer service to an upper layer by using a physical channel. The PHY layer is connected with a medium access control (MAC) layer which is an upper layer through a transport channel. Data is transferred between the MAC layer and the PHY layer through the transport channel. The transport channel is classified depending on how the data is transferred through the radio interface.

Further, data is transferred between different PHY layers (that is, between the PHY layers of the transmitter and the receiver) through the physical channel. The physical channel may be modulated by an orthogonal frequency division multiplexing (OFDM) scheme and uses a time and a frequency as the radio resource.

As an example, a physical downlink control channel (PDCCH) among the physical channels notifies resource allocation of a paging channel (PCH) and a downlink shared channel (DL-SCH) and hybrid automatic repeat request (HARQ) information associated with the DL-SCH to the UE and the PDCCH may transport an uplink scheduling grant notifying the resource allocation of the uplink transmission to the UE. Further, a physical control format indicator channel (PCFICH) notifies the number of OFDM symbols used in the PDCCHs to the UE and is transmitted every sub-frame. Further, a physical hybrid ARQ indicator channel (PHICH) transports an HARQ ACK/NAK signal as a response of the uplink transmission. Further, a physical uplink control channel (PUCCH) transports uplink control information such as HARQ ACK/NAK, a scheduling request, a CQI for the downlink transmission. Further, a physical uplink shared channel (PUSCH) transports an uplink shared channel (UL-SCH).

The MAC layer may perform mapping between a logic channel and the transport channel and multiplexing or demultiplexing to a transport block provided to the physical channel onto the transport channel of an MAC service data unit (SDU) that belongs to the logic channel. The MAC layer provides a service to a radio link control (RLC) layer through the logic channel. The logic channel may be divided into a control channel for transferring control area information and a traffic channel for transferring user area information.

A function of the RLC layer includes concatenation, segmentation, and reassembly of an RLC SDU. In order to assure various quality of services (QoS) requested by a radio bearer (RB), the RLC layer provides three operating modes of a transparent mode (TM), an unacknowledged mode (UM), and an acknowledged mode (AM).

The RLC SDUs may be supported with various sizes and as an example, may be supported by a byte unit. RLC protocol data units (PDUs) are defined only when transmission opportunity is notified from the lower layer (for example, the MAC layer) and when the transmission opportunity is notified, the RLC PDUs are transferred to the lower layer. The transmission opportunity may be notified together with the sizes of the total RLC PDUs to be transmitted. Hereinafter, the RLC layer will be described in detail with reference to FIG. 4.

A function of a packet data convergence protocol (PDCP) layer on the user plane includes transferring of user data, header compression, and ciphering. A function of the PDCP layer on the user plane includes transferring of control plane data and ciphering/integrity protection.

The RRC layer serves to control the logic channel, the transport channel, and the physical channels in association with configuration, re-configuration, and release of the RBs. The RB means a logic route provided by the first layer (PHY layer) and the second layers (the MAC layer, the RLC layer, and the PDCP layer) in order to transfer data between the UE and the network. Configuring the RB defines features of the radio protocol layer and the channel in order to provide a specific service and means a process of setting respective detailed parameters and operating methods. The RB may be divided into two types of a signaling RB (SRB) and a data RB (DRB) again. The SRB is used as a passage for transmitting the RRC message on the control plane and a non-access stratum (NAS) message and the DRB is used as a passage for transmitting the user data on the user plane.

An NAS layer is positioned above the RRC layer and performs functions such as session management and mobility management.

When an RRC connection is established between the RRC layer of the UE and the RRC layer of the E-UTRAN, the UE is in an RRC connected state and if not, the UE is in an RRC idle state.

A downlink transport channel for transmitting data from the network to the UE includes a broadcast channel (BCH) for transmitting system information and besides, a downlink shared channel (SCH) for transmitting user traffic or a control message. Traffic or a control message of a downlink multicast or broadcast service may be transported through the downlink SCH or transported through a separate downlink multicast channel (MCH). Meanwhile, an uplink transport channel for transporting data from the UE to the network includes a random access channel (RACH) for transporting an initial control message and besides, an uplink shared channel (SCH) for transporting the user traffic or the control message.

The logical channel that is positioned on the transport channel and mapped to the transport channel includes a broadcast control channel (BCCH), a paging control channel (PCCH), a common control channel (CCCH), a multicast control channel (MCCH), a multicast traffic channel (MTCH), and the like.

The physical channel is constituted by a plurality of symbols in a time domain and a plurality of sub-carriers in a frequency domain. One sub-frame is constituted by a plurality of OFDM symbols in a time domain. One sub-frame is constituted by a plurality of resource blocks and one resource block is constituted by the plurality of symbols and the plurality of sub-carriers. Further, each sub-frame may use specific sub-carriers of specific symbols (e.g., first symbols) of a corresponding sub-frame for the PDCCH. A transmission time interval (TTI) which is a unit time when the data is transmitted is 1 ms corresponding to one sub-frame.

Figure 4:
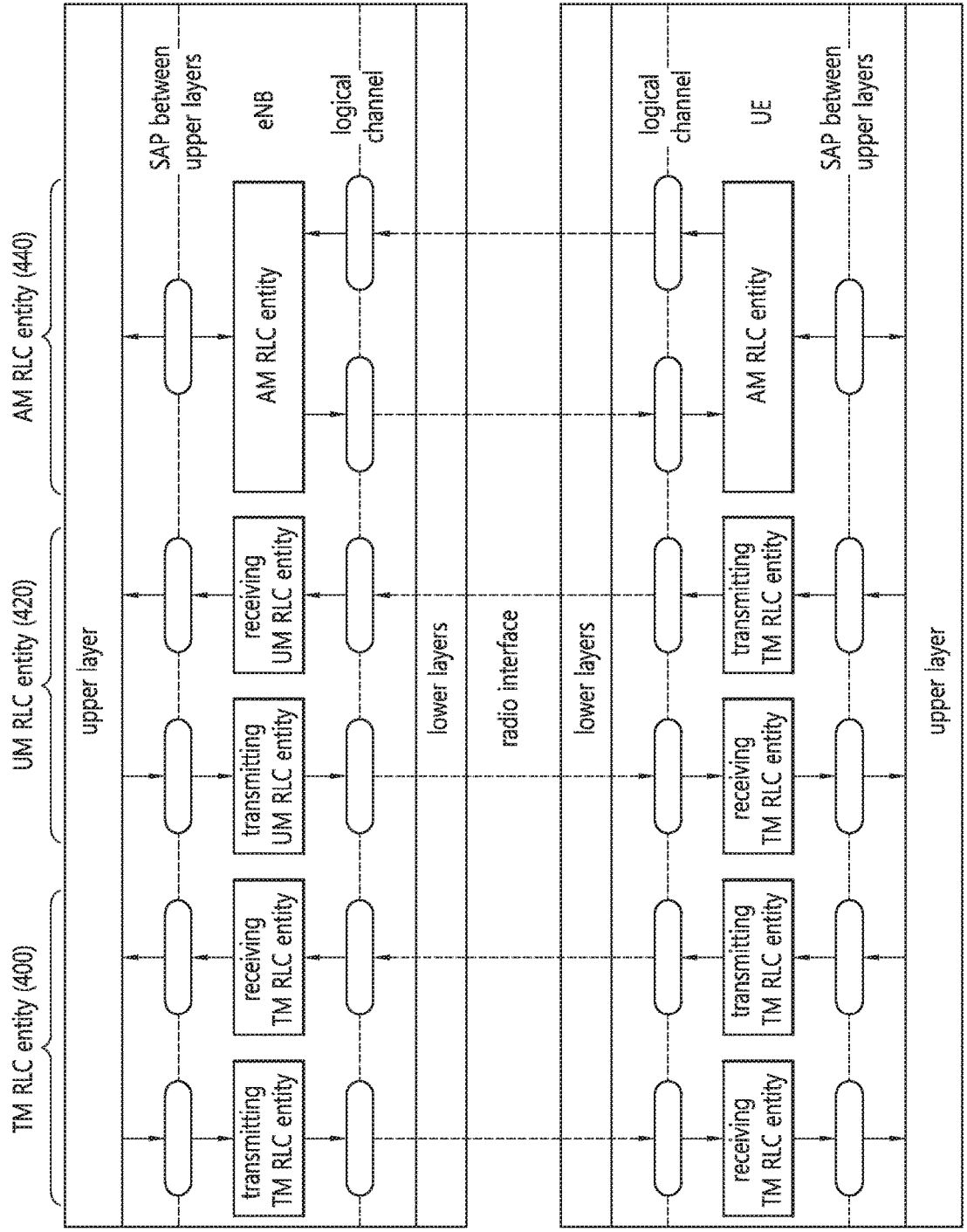
FIG. 4 is a diagram illustrating an overview of one example of an RLC sublayer model according to the present invention.

FIG. 4 is a diagram illustrating an outline of an example of an RLC sublayer model according to the embodiment of the present invention.

Referring to FIG. 4, any RLC entity is divided into different RLC entities according to a data transmission scheme. As an example, the RLC entity includes a TM RLC entity 400, a UM RLC entity 420, and an AM RLC entity 440.

The UM RLC entity 420 may be constituted to receive or transfer RLC PDUs through logical channels (for example, DL/UL DTCH, MCCH or MTCH). Further, the UM RLC entity 420 may transfer or receive a unacknowledged mode data (UMD) PDU.

The UM RLC entity is constituted by a transmission UM RLC entity or a reception UM RLC entity.

The transmission UM RLC entity receives the RLC SDUs from the upper layer and transmits the RLC PDUs to a peer reception UM RLC entity through the lower layer. When the transmission UM RLC entity configures the UMD PDUs from the RLC SDUs, if the specific transmission opportunity is notified by the lower layer, the RLC SDUs are segmented or concatenated to constitute the UMD PDUs so as to become within a total size of the RLC PDUs indicated by the lower layer and is constituted so that related RLC headers are included in the UMD PDU.

The reception UM RLC entity transfers the RLC SDUs to the upper layer and receives the RLC PDUs from the peer reception UM RLC entity through the lower layer. When the reception UM RLC entity receives the UMD PDUs, the reception UM RLC entity detects whether the UMD PDUs are duplicately received to discard the duplicated UMD PDUs, reorder a sequence of the UMD PDUs when the UMD PDUs are received out of the sequence, avoid excessive reorder delays by detecting loss of the UMD PDUs in the lower layer, reassemble the RLC SDUs from the reordered UMD PDUs, transfer the reassembled RLC SDUs to the upper layer in an ascending order of an RLC sequence number (SN), and discard the UMD PDUs which can not be reassembled to the RLC SDU due to the UMD PDU loss which belongs to the specific RLC SDU in the lower layer. During the RLC re-establishment, the reception UM RLC entity reassembles the RLC SDUs from the UMD PDUs received out of the sequence to transfer the reassembled RLC SDUs to the upper layer and all of the remaining UMD PDUs which may not be reassembled to the RLC SDUs are discarded, initialize related status parameters and stop related timers.

Meanwhile, the AM RLC entity 440 may be constituted to receive or transfer the RLC PDUs through logical channels (for example, DL/UL DCCH or DL/UL DTCH). The AM RLC entity transfers or receives an AMD PDU or ADM PDU segment and transfers or receives an RLC control PDU (for example, a STATUS PDU).

If the STATUS PDU is triggered and a block timer (t-StatusProhibit) is not running or completed, the STATUS PDU is transmitted at the next transmission opportunity. Accordingly, the UE predicts the size of the STATUS PDU and considers the STATUS PDU as data available for transmission in the RLC layer.

The AM RLC entity is constituted by a transmitting side and a receiving side.

The transmitting side of the AM RLC entity receives the RLC SDUs from the upper layer and transmits the RLC PDUs to a peer AM RLC entity through the lower layer. When the transmitting side of the AM RLC entity constitutes the AMD PDUs from the RLC SDUs, the RLC SDUs are segmented or concatenated in order to be suitable within the total size of the RLC PDU(s) indicated by the lower layer when the specific transmission opportunity is notified by the lower layer to constitute the AMD PDUs. The transmitting side of the AM RLC entity supports retransmission (ARQ) of the RLC data PDUs. When the RLC data PDU to be retransmitted is not suitable within the total size of the RLC PDU(s) indicated by the lower layer when the specific transmission opportunity is notified by the lower layer, the AM RLC entity re-segments the RLC data PDU to the AMD PDU segments.

In this case, the number of re-segmentation is not limited. When the transmitting side of the AM RLC entity creates the AMD PDUs from the RLC SDUs received from the upper layer or AMD PDU segments from the RLC data PDUs to be retransmitted, related RLC headers are included in the RLC data PDU.

The receiving side of the AM RLC entity receives the RLC SDUs from the upper layer and receives the RLC PDUs to the peer AM RLC entity through the lower layer.

When receiving the RLC data PDUs, the receiving side of the AM RLC entity detects whether the RLC data PDUs are duplicatively received, discards the duplicated RLC data PDUs, reorders the sequence of the RLC data PDUs when the RLC data PDUs are received out of the sequence, detects the loss of the RLC data PDUs generated in the lower layer and requests the retransmission to the AM RLC entity, reassembles the RLC SDUs from the reordered RLC data PDUs, and transfers the reassembled RLC SDUs to the upper layer in the reassembled sequence.

During the RLC re-establishment, the receiving side of the AM RLC entity reassembles the RLC SDUs from the RLC data PDUs received out of the sequence if possible to transfer the reassembled RLC SDUs to the upper layer, discards all of the remaining RLC data PDUs which may not be reassembled with the RLC SDUs, and initializes the related status parameters and stops the related timers.

Figure 5:
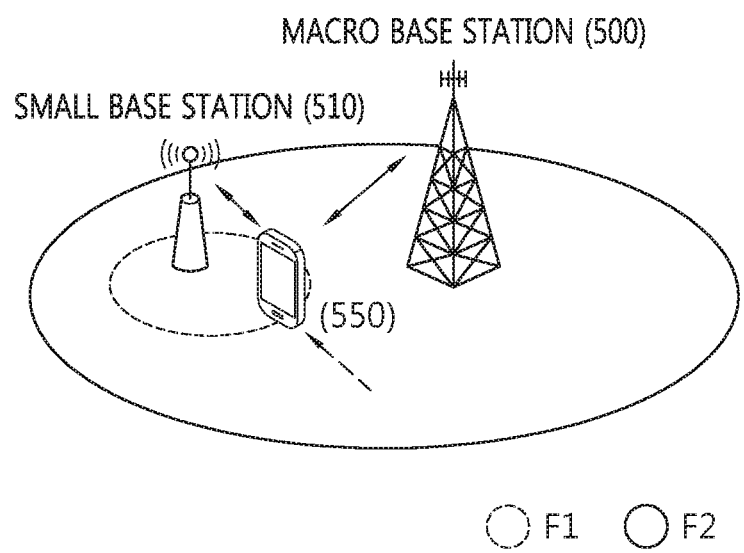
FIG. 5 illustrates one example of a dual connectivity situation of UE applied to the present invention.

FIG. 5 illustrates one example of a dual connectivity situation of the UE applied to the embodiment of the present invention.

Referring To FIG. 5, UE 550 positioned in a service area of a macro cell in a macro eNB 500 (alternatively, an anchor base station) enters an area over-laid with the service acre of a small cell in a small eNB 510 (alternatively, an assisting base station).

In order to support an additional data service through the small cell in the small eNB while maintaining existing wireless connection and data service connection through the macro cell in the macro eNB, the network constitutes dual connection with respect to the UE.

As a result, the user data arriving to the macro cell may be transferred to the UE through the small cell in the small eNB. In detail, an F2 frequency band is allocated to the macro eNB and an F1 frequency band is allocated to the small eNB. The UE may receive the service from the macro eNB through the F2 frequency band and simultaneously receive the service from the small eNB through the F1 frequency band.

Figure 6:
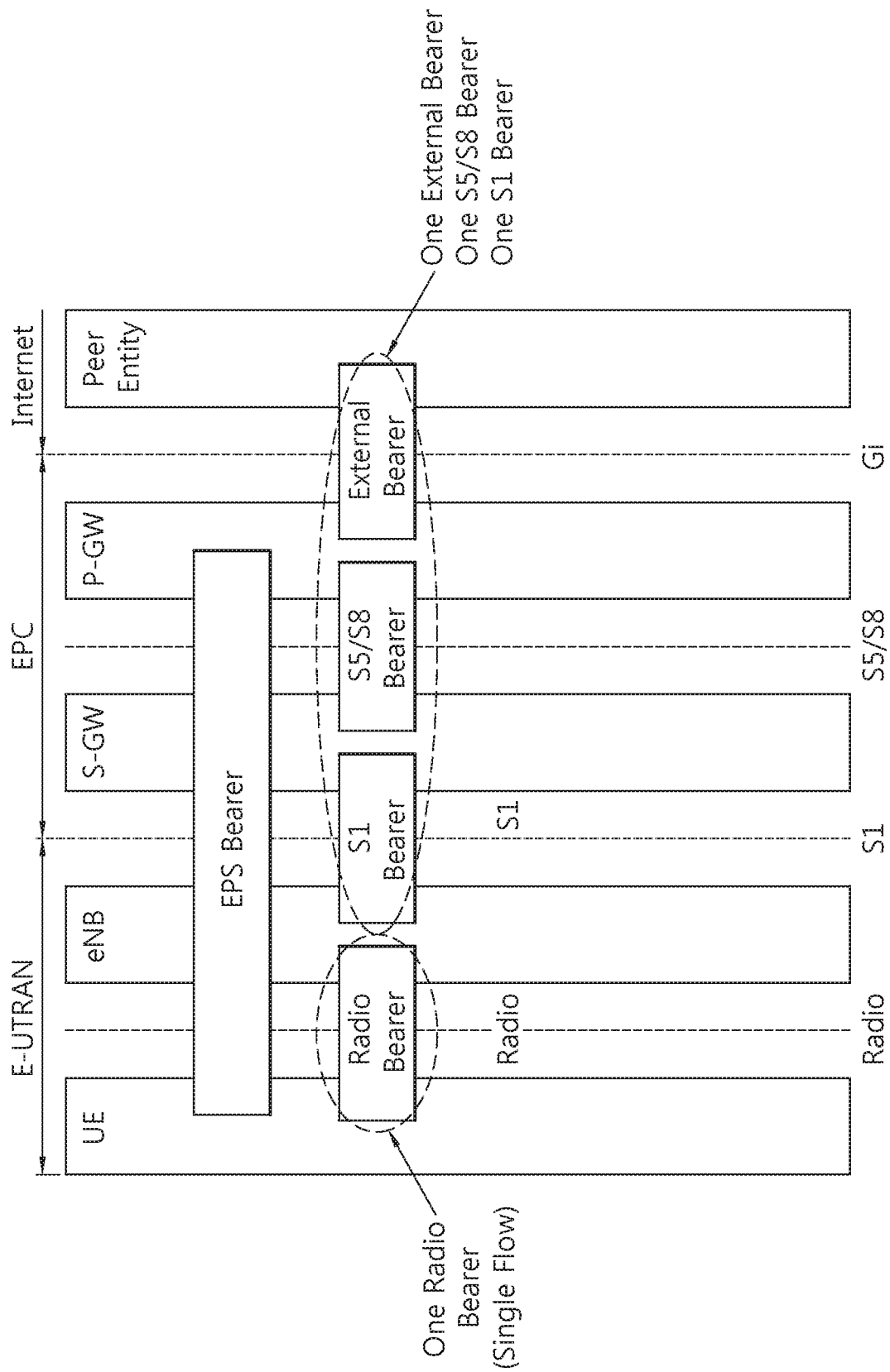
FIG. 6 illustrates an example of an EPS bearer structure when multi-flows are configured in the dual connectivity situation.

FIG. 6 illustrates an example of an EPS bearer structure in the case where the single flow is constituted.

Referring to FIG. 6, the RB is a bearer provided from the Uu interface in order to support the service of the user. In the wireless communication system, each bearer is defined for each interface to ensure independency between the interfaces.

The bearer provided by the wireless communication system is collectively called an evolved packet system (EPS) bearer. The EPS bearer is a transmission path generated between the UE and the P-GW. The P-GW may receive an IP flow from the Internet or transmit the IP flow to the Internet. One or more EPS bearers may be constituted per UE, each EPS bearer may be divided into an E-UTRAN radio access bearer (E-RAB) and an S5/S8 bearer, and the E-RAB may be divided into a radio bearer (RB) and an S1 bearer. That is, one EPS bearer corresponds to one RB, one S1 bearer, and one S5/S8 bearer, respectively. The IP flow may have a different quality of service (QoS) characteristic according to which service (alternatively, application) is used, and the IP flow having the different QoS characteristic may be mapped and transmitted for each EPS bearer. The EPS bearers may be divided based on an EPS bearer identity. The EPS bearer identity is allocated by the UE or the MME.

The Packet Gateway (P-GW) is a network node connecting the wireless communication network (for example, an LTE network) and another network according to the present invention. The EPS bearer is defined between the UE and the P-GW. The EPS bearer is further subdivided between the respective nodes, and the RB, the S1 bearer, and the S5/S8 bearer are defined between the UE and the base station, between the base station and the S-GW, and between the S-GW in the EPS and the P-GW, respectively. Each bearer is defined through the QoS. The QoS is defined through a data rate, an error rate, a delay, and the like.

Accordingly, if the QoS which needs to be entirely provided by the wireless communication system is defined as the EPS bearer, each QoS is defined for each interface. Each interface is to set the bearer according to the QoS which needs to be provided by the interface. Since The bearer of each interface is provided by dividing the QoS of the entire EPS bearer for each interface, the EPS bearer, the RB, and the SI bearer basically have one-to-one relationship.

That is, the LTE wireless communication system basically has a single flow structure and one RB is constituted for one EPS bearer. In other words, one EPS bearer is mapped with the S1 bearer through one RB. In the case of the single flow, one EPS bearer is serviced through one RB. In this case, one RB (for example, a PDCP entity, an RLC entity, a MAC entity, and a PHY layer) is set in the base station for the corresponding EPS bearer and one RB is set even in the UE.

Figure 7:
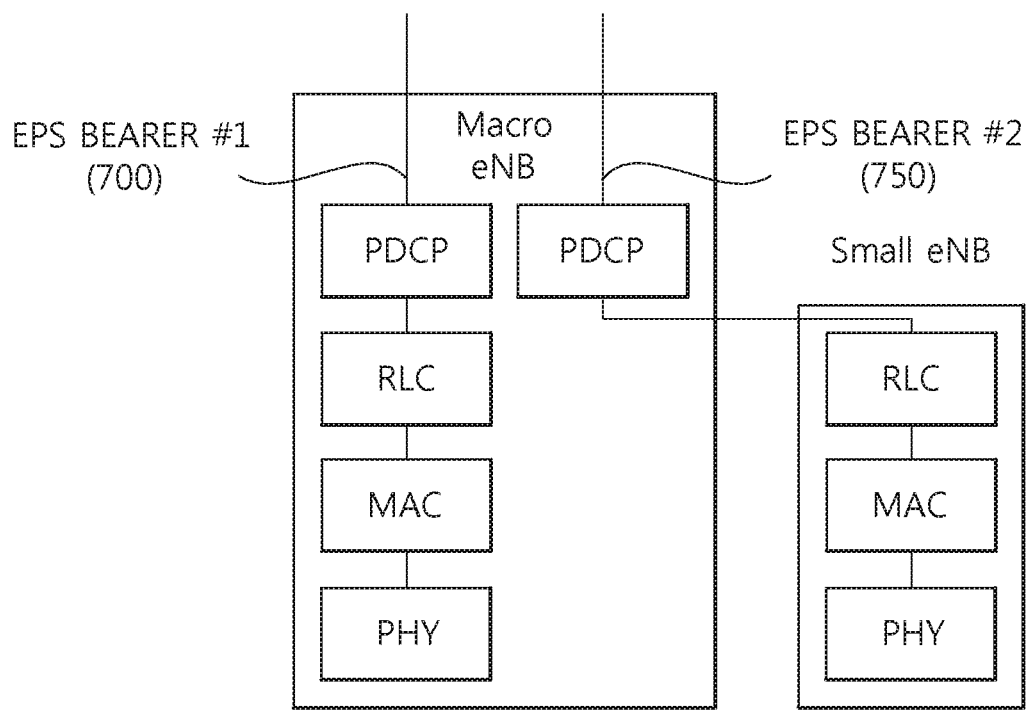
FIG. 7 illustrates an example of a network structure of the macro base station and the small base station in the case of a single flow in a dual connectivity situation.

FIG. 7 illustrates an example of a network structure of the macro base station and the small base station in the case of a single flow in a dual connectivity situation. FIG. 7 illustrates a case in which a service is provided to UE through two EPS bearers.

Referring to FIG. 7, the macro base station includes two PDCP entities, an RLC entity, an MAC entity, and a PHY layer, but the small base station the RLC entity, the MAC entity, and the PHY layer. EPS bearer #1 700 provides the service to the UE through RB (PDCP/RLC/MAC/PHY) configured in the macro base station. On the contrary, EPS bearer #2 750 provides the service to the UE through the PDCP entity configured in the macro base station and the RB (PDCP/RLC/MAC/PHY) configured in the small base station. Therefore, the service is provided through one RB for each EPS bearer in the single flow.

Figure 8:
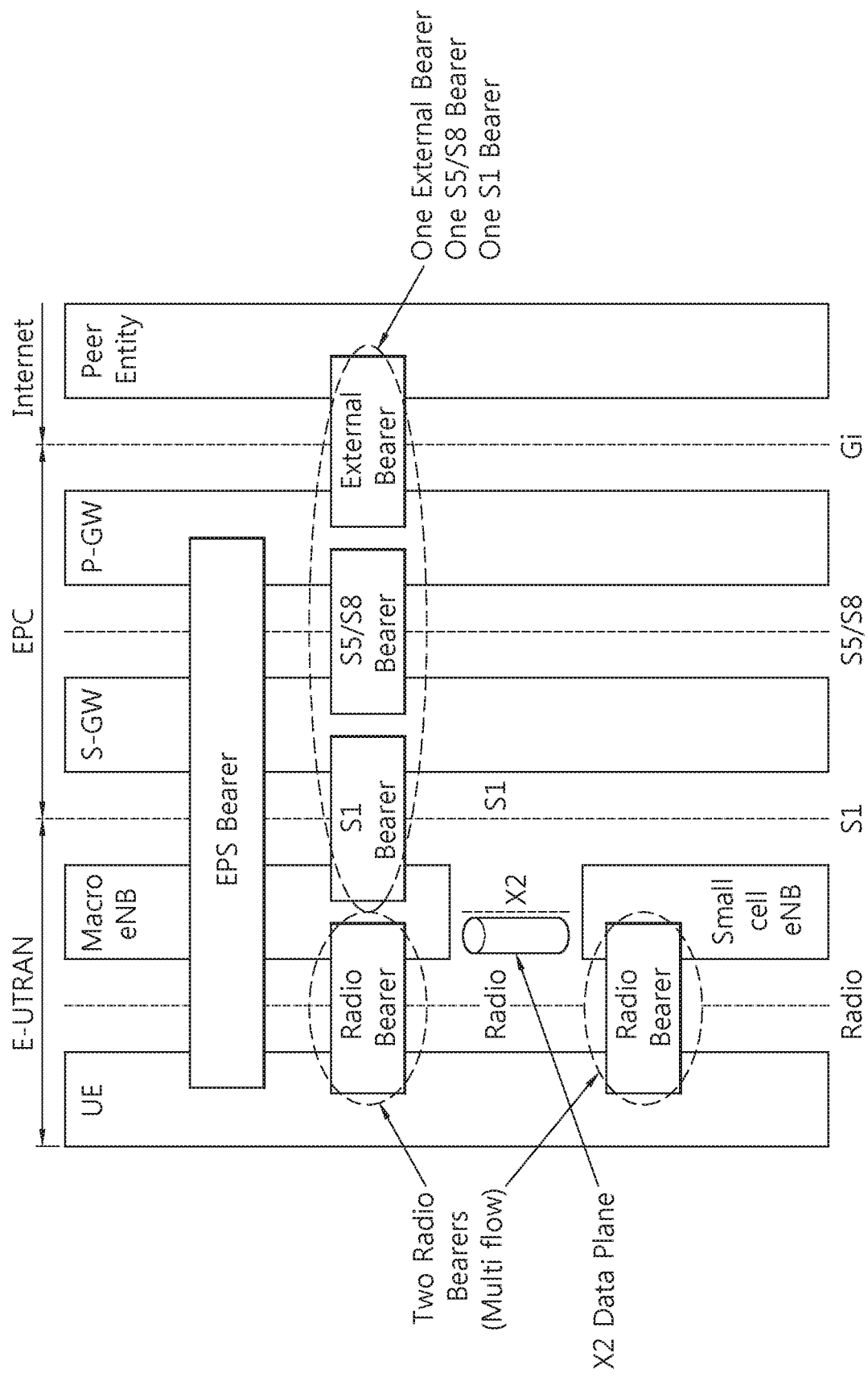
FIG. 8 illustrates an example of an EPS bearer structure when multi-flows are configured in the dual connectivity situation.

FIG. 8 illustrates an example of an EPS bearer structure when multi-flows are configured in the dual connectivity situation.

Referring to FIG. 8, when the multi-flows are configured, the service is provided through not one RB but two RBs configured in the macro base station and the small base station, respectively with respect to one EPS bearer. The UE may simultaneously receive the service through the RB configured in the macro base station and the RB configured in the small base station with respect to one EPS bearer. This is a type in which one EPS bearer provides the service through two RBs. As described above, in the case where one EPS bearer provides the service to the UE through two or more RBs, it regarded that the multi-flows are configured.

Figure 9:
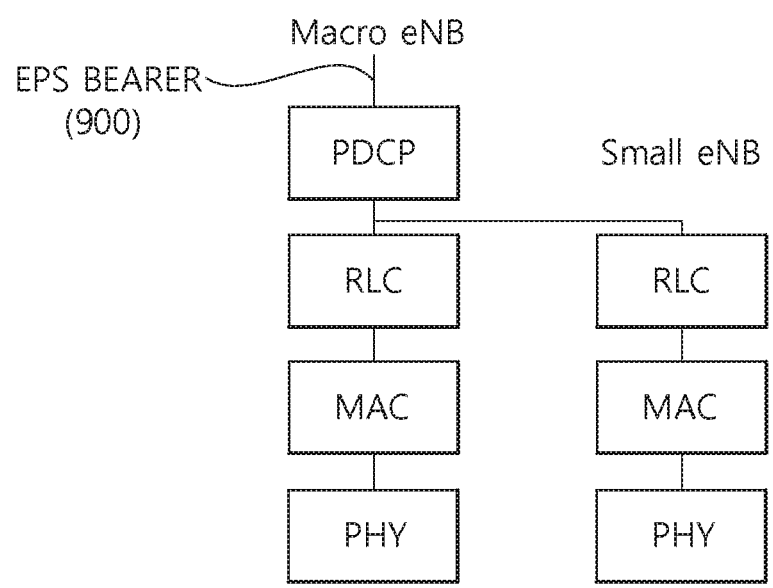
FIG. 9 illustrates an example of a network structure of the macro base station and the small base station in the case of multi-flows.

FIG. 9 illustrates an example of a network structure of the macro base station and the small base station in the case of multi-flows.

Referring to FIG. 9, the macro base station includes the PDCP entity, the RLC entity, the MAC entity, the PHY layer, but the small base station includes the RLC entity, the MAC entity, and the PHY layer. In FIG. 9, unlike FIG. 7, the RBs are configured in the macro base station and the small base station, respectively with respect to one EPS bearer 900 to provide the service the UE. That is, the macro base station and the small base station provide the service to the UE through the multi-flows with respect to one EPS bearer.

Meanwhile, when the dual connectivity is considered, packet delivery processes in the case of the single flow and in the case of the multi-flows may be described below.

Figure 10:
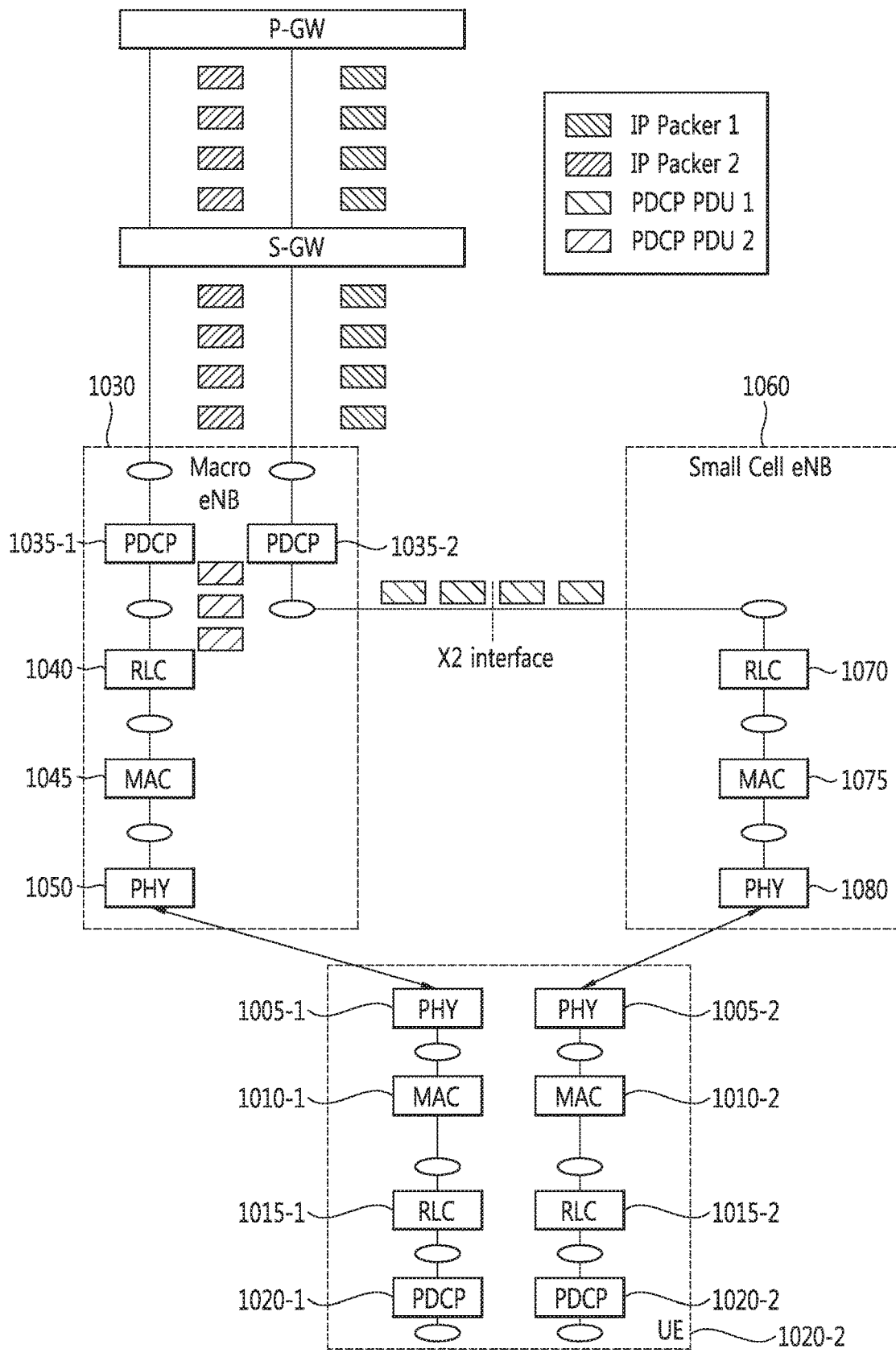
FIG. 10 illustrates a packet delivery process in the case of the single flow when the dual connectivity is considered.

FIG. 10 illustrates a packet delivery process in the case of the single flow when the dual connectivity is considered.

Referring to FIG. 10, a macro base station 1030 receives packets for two EPS bearers, respectively through P-GW and S-GW. Herein, flows in which the packets are transmitted are mapped to each EPS bearer. It is assumed that packets transmitted through EPS bearer #1 are packet 1 and packets transmitted through EPS bearer #2 are packet 2.

A PDCP 1035-1 of the macro base station 1030 receives packet 1 from the S-GW and a PDCP 1035-2 receives packet 2 from the S-GW. The PDCP 1035-1 generates PDCP PDU1 based on packet 1 and the PDCP PDU1 is delivered to an RLC 1040 of the macro base station 1030 and transformed to a format suitable for each entity and layer to be transmitted to UE 1000 through an MAC 1045 and a PHY 1050.

The PDCP 1035-2 of the macro base station 1030 generates PDCP PDU2 based on packet 2 and the PDCP PDU 2 is delivered to an RLC 1070 of a small base station 1060 and transformed to a format suitable for each entity and layer to be transmitted to the UE through an MAC 1075 and a PHY 1080.

Radio protocol entities are present in the UE 1000 with respect to EPS bearer #1 and EPS bearer #2, respectively. In other words, the PDCP/RLC/MAC/PHY entity (alternatively, layer) is present in the UE 1000 with respect to EPS bearer #1 and the PDCP/RLC/MAC/PHY entity (alternatively, layer) is present with respect to EPS bearer #2. In detail, a PHY 1005-1, an MAC 1010-1, an RLC 1015-1, and a PDCP 1020-1 are present with respect to EPS bearer #1 and service data and packets for EPS bearer #1 are processed. A PHY 1005-2, an MAC 1010-2, an RLC 1015-2, and a PDCP 1020-2 are present with respect to EPS bearer #2 and service data and packets for EPS bearer #2 are processed.

Meanwhile, the macro base station 1030 and the small base station 1060 may be connected through an X2 interface. That is, the macro base station 1030 delivers PDCP PDU2 of the PDCP 1035-2 to the RLC 1040 of the small base station 1060 through the X2 interface. Herein, the X2 interface may be used as an X3 interface or another expression designating an interface between other macro base station and other small base station. In this case, when the X2 interface between the macro base station 1030 and the small base station 1060 is constituted by a non-ideal backhaul, the transmission delay of approximately 20 to 60 ms may occur. However, even in this case, since the RLC 1015-1 and the PDCP 1020-1 for EPS bearer #1 and the RLC 1015-2 and the PDCP 1020-2 for EPS bearer #2 are separately configured in the UE 1000, a problem does not occur even when the RLC SDUs are sequentially delivered from the RLC entity to the PDCP entity of the AM.

Figure 11:
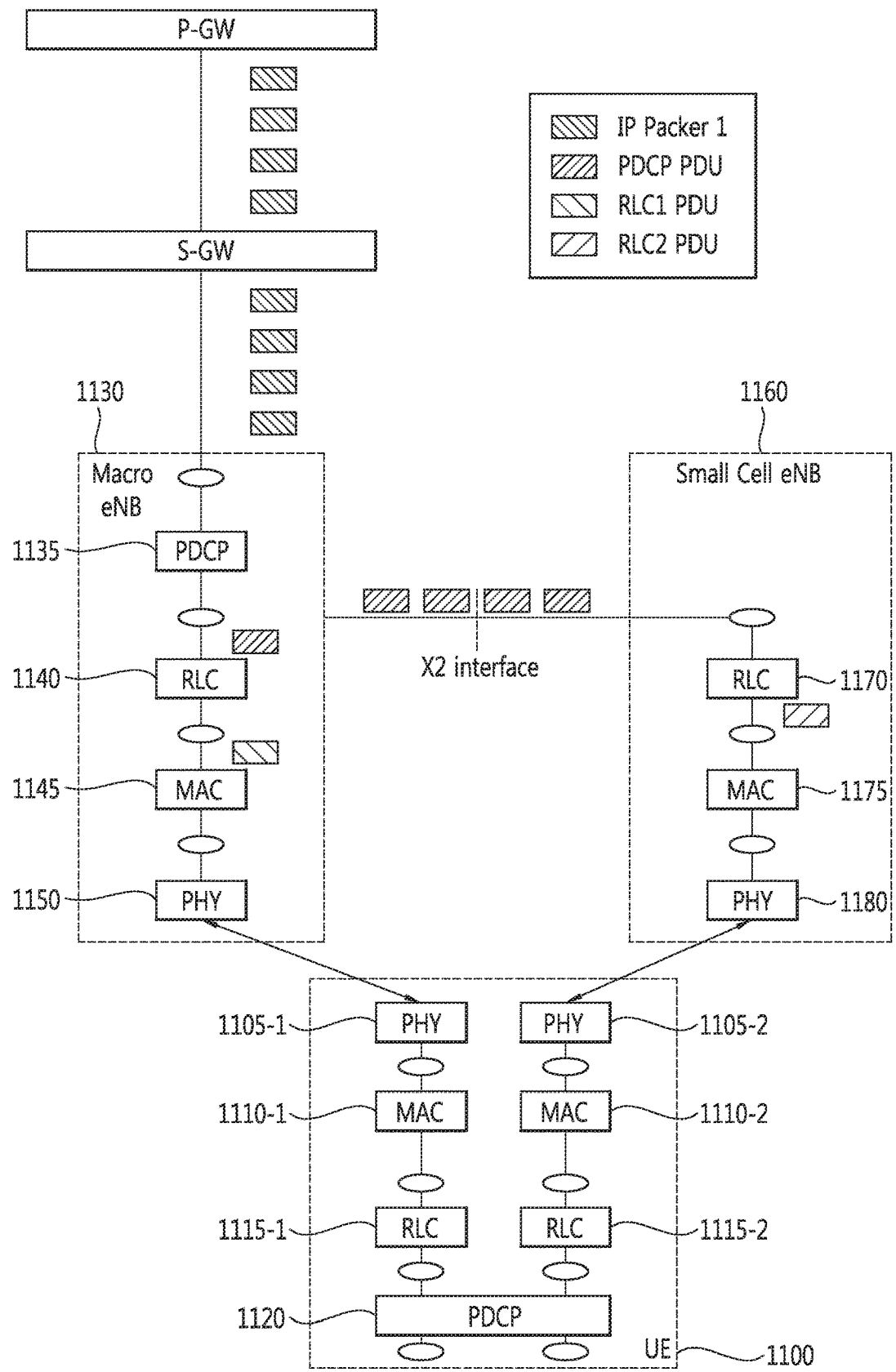
FIG. 11 illustrates a packet delivery process in the case of the multi-flows when the dual connectivity is considered.

FIG. 11 illustrates a packet delivery process in the case of the multi-flows when the dual connectivity is considered.

Referring to FIG. 11, a macro base station 1130 receives packets for one EPS bearer through a P-GW and an S-GW. The macro base station 1130 and a small base station 1160 configure RBs, respectively with respect to one EPS bearer. In detail, the macro base station 1130 constitutes a PDCP 1135, an RLC 1140, an MAC 1145, and a PHY 1150 and the small base station 1160 constitutes an RLC 1170, an MAC 1175, and a PHY 1180.

The PDCP 1135 of the macro base station 1130 receives the packet from the S-GW. The PDCP 1135 generates PDCP PDUs based on the packet and appropriately distributes and delivers the PDCP PDUs to the RLC 1140 of the macro base station 1130 and the RLC 1170 of the small base station 1160 according to a predefined rule or a predetermined method. For example, PDCP PDUs having odd SNs among the PDCP PDUs may be transmitted to the RLC 1140 of the base station 1130 and PDCP PDUs having even SNs may be transmitted to the RLC 1170 of the small base station 1160.

The RLC 1140 generates RLC PDU1(s) and the RLC PDU1(s) is transformed to a format suitable for each entity or layer to be transmitted to the UE 1100 through the MAC 1145 and the PHY 1150. Further, the RLC 1170 generates RLC PDU2(s) and the RLC PDU2(s) is transformed to a format suitable for each entity or layer to be transmitted to the UE 1100 through the MAC 1175 and the PHY 1180.

Two radio protocol entities are present with respect to the EPS bearer. In other words, the PDCP/RLC/MAC/PHY entity (alternatively, layer) is present in the UE 1100 as the RB corresponding to the macro base station 1130 and the PDCP/RLC/MAC/PHY entity (alternatively, layer) is present as the RB corresponding to the small base station 1160. In detail, the PHY 1105-1, the MAC 1110-1, the RLC 1115-1, and a PDCP 1120 corresponding to the macro base station 1130 are present and the PHY 1005-2, the MAC 1010-2, and the RLC 1015-2 corresponding to the small base station 1160 are present with respect to the EPS bearer. The PDCP 1120 is a PDCP entity simultaneously corresponding to the macro base station 1130 and the small base station 1160. That is, in this case, two RLC entities 1115-1 and 1115-2 are present at the UE 1100 end, but two RLC entities 1115-1 and 1115-2 correspond to one PDCP entity 1120.

As described above, the macro base station 1130 and the small base station 1160 may be connected through the X2 interface. That is, the macro base station 1130 delivers some of PDCP PDU2 of the PDCP 1135-2 to the RLC 1140 of the small base station 1160 through the X2 interface. Herein, the X2 interface may be used as an X3 interface or another expression (for example, Xn) designating an interface between other macro base station and other small base station. In this case, when the X2 interface between the macro base station 1130 and the small base station 1160 is constituted by the non-ideal backhaul, the transmission delay of approximately 20 to 60 ms may occur. The PDCP entity 1120 of the UE 1100 receives RLC SDUs (that is, PDCP PDUs) from two RLC entities 1115-1 and 1115-2, respectively and generates PDCP SDUs and delivers the generated PDCP SDUs to the upper layer and a difference in time between receiving RLC SDUs (that is, PDCP PDUs) received from the PDCP entity 1120 from the RLC entity 1115-1 and receiving RLC SDUs (that is, PDCP PDUs) from the RLC entity 1115-2 occurs and a problem may occur when the PDCP entity 1120 sequentially transmits the PDCP SDUs to the upper layer.

As illustrated in FIG. 11, one PDCP 1135 present in the macro base station 1130 and one PDCP entity 1120 is present in the UE 1100 for the multi-flows in the dual connectivity environment. In addition, the RLC entities 1140 and 1170 are present in the macro base station 1130 and the small base station 1130, respectively and two RLC entities 1115-1 and 1115-2 are present even in the UE 1100 to correspond to the RLC entities 1140 and 1170. That is, in-sequence delivery to the upper layer may be guaranteed at the RLC entities 1115-1 and 1115-2 ends of the UE 1100. However, the RLC SDUs (that is, PDCP PDUs) are delivered from not one RLC entity but two RLC entities 1115-1 and 1115-2 at the PDCP entity 1120 end of the UE 1100. In-sequence delivery at the RLC entities 1115-1 and 1115-2 may not guarantee in-sequence receiving of the PDCP PDUs at the PDCP entity end. Further, the transmission delay of 20 to 60 ms may be accompanied in transmission of the PDCP PDU(s) from the PDCP entity 1135 of the macro base station 1130 to the RLC entity 1170 of the small base station 1160 and a time delay may occur between transmission of the PDCP PDU(s) toward the RLC entity 1140 of the macro base station 1130 and transmission of the PDCP PDU(s) toward the RLC entity 1170 of the macro base station 1160. Consequently, even when the PDCP entity 1120 of the UE 1100 receives the PDCP PDU(s) transmitted by the PDCP entity 1135 of the macro base station 1130, a difference in receiving time between transmission through a lower end of the RLC of the macro base station and transmission through a lower end of the RLC of the small base station occurs and it is difficult to for the PDCP entity 1120 of the UE 1100 to sequentially receive the PDCP PDU(s).

Figure 12:
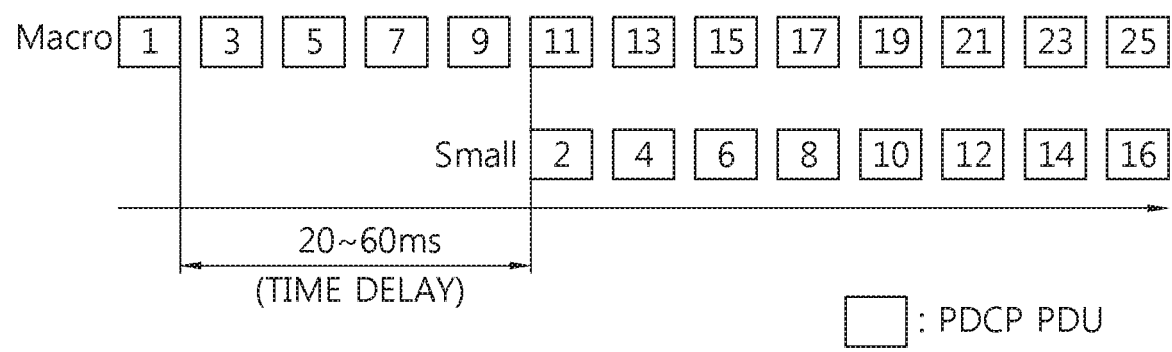
FIG. 12 illustrates an example of a PDCP PDU receiving timing in a PDCP entity of UE.

FIG. 12 illustrates an example of a PDCP PDU receiving timing in a PDCP entity of UE. FIG. 12 exemplarily illustrates a time when a PDCP PDU transmitted through a macro base station and a PDCP PDU transmitted through a small base station reach a PDCP entity of UE. The macro base station may determine the PDCP PDU to be transmitted through the macro base station and the PDCP PDU to be transmitted through the small base station with respect to the service for one EPS bearer. FIG. 12 exemplarily illustrates a case in which odd numbers among PDCP sequence numbers (SNs) are transmitted through the macro base station and even numbers are transmitted through the small base station.

Referring to FIG. 12, there is a difference in time delay between a receiving time of the PDCP PDCU transmitted through the macro base station in the UE and a receiving time of the PDCP PDCU transmitted through the small base station in the UE. A transmission delay of approximately 20 to 60 ms may occur in the PDCP PDU transmitted through the small base station. In this case, when the PDCP entity of the UE non-sequentially receives the PDCP PDUs due to a difference in time between RLC (AMD) SDUs delivered from two RLC entities and the PDCP entity immediately delivers the received PDCP PDUs to the upper layer (for example, an application layer), sequential transmission is not performed.

That is, since the PDCP PDU transmitted from one PDCP entity of the macro base station is transmitted through the RLC entity of the macro base station and the RLC entity of the small base station in the multi-flow structure, the time delay occurs in receiving the PDCP PDU in the PDCP entity of the UE. Accordingly, there is a problem in sequentially transmitting the PDCP SDUs from the PDCP entity to the upper layer.

The PDCP entity of the UE deciphers and header compresses the received PDCP PDCU and transmits the PDCP SDU to the upper layer. In this case, when there is a PDCP SDU having the sequence number which is smaller than the sequence number (SN) of the current PDCP SDU, the PDCP SDUs are transmitted to the upper layer in the order from the smaller SN to the larger SN.

Meanwhile, a transmission side of the PDCP entity may operate a discard timer. Duration of the discard timer may be configured from the upper layer and when the PDCP SDU is received from the upper layer, the timer starts. When the discard has expired, the PDCP entity discards the corresponding PDCP SDU. Accordingly, even in the existing case, a PDCP SDU of a specific SN may be missed due to expiration of the discard timer.

That is, when the multi-flows are supported in the dual connectivity situation, in the case where the PDCP PDUs are not sequentially received, the case may be determined as any one of two cases described below. However, which case of two cases described below the case is may not be distinguished.

The first case may be a case in which the discard timer has expired. In the base station, the discard timer is driven every PDCP SDU processed by the PDCP entity of the base station while uplink transmission. In the case where the quantity of packets input into the PDCP by driving the discard timer is larger than a predetermined reference, packets which are not processed within the duration of the discard timer may be discarded and the corresponding packets may be newly processed based on a retransmission request performed in the upper layer.

The second case may be a case of a receiving delay of a transmission path of the PDCP PDU. The PDCP entity of the macro base station may separate and transmit the PDCP through the macro base station and the small base station due to the multi-flows. In this case, a time difference may occur at the time of receiving the PDCP PDU in the PDCP entity of the UE due to a delay caused due to different paths.

In such a situation, in each of the case of the multi-flow transmission path receiving delay and the case where the PDCP discard timer has expired, a method that may sequentially transmit the PDCP SDUs to the upper layer in the PDCP entity of the UE is required.

A sequential transmission method of the PDCP SDUs to the upper layer considering the multi-flows will be described below.

The PDCP sequence number (SN) of the PDCP SDU corresponding to the PDP PDU received in the PDCP entity is confirmed and if the PDCP SN of the PDCP SDU is not sequential (that is, when the SN prior to the PDCP SN of the PDCP SDU is missed), an in-sequence timer for the PDCP SDU is driven. In this case, the duration of the in-sequence timer may be determined by considering the receiving delay of the transmission path of the PDCP PDU in the case of the multi-flows. Alternatively, the duration of the in-sequence timer may be determined by considering an overall situation of the system.

When the in-sequence timer for the PDCP SDU has expired, the PDCP SDU is transmitted to the upper layer. The reason is that when the PDCP PDU corresponding to the PDCP SDU for the PDCP SN which is missed is not received by the PDCP entity of the UE until the in-sequence timer has expired, the corresponding PDCP SDU is removed by the elapse of the discard timer at the transmission side of the PDCP entity of the macro base station.

While the in-sequence timer for the PDCP SDU is running, when the PDCP PDU corresponding to the PDCP SDU for the PDCP SN prior to (that is, missed from) the PDCP SN of the PDCP SDU is received, and as a result, the PDCP SDUs may be sequentially transmitted, the in-sequence timer has expired and the corresponding PDCP SDUs are sequentially transmitted to the upper layer.

A transmission control protocol (TCP) is a protocol designed based on sequential reception of the packets. When the packet is not received in the TCP according to implementation, a window which may be transmitted at the TCP end may be reduced, which may cause reduce the transmission efficiency. Accordingly, when the packet is transmitted to the upper layer at a predetermined radio protocol end, even though the delay time is added, guaranteeing the sequential transmission may be more advantageous in terms of the overall capability of the network.

Figure 13:
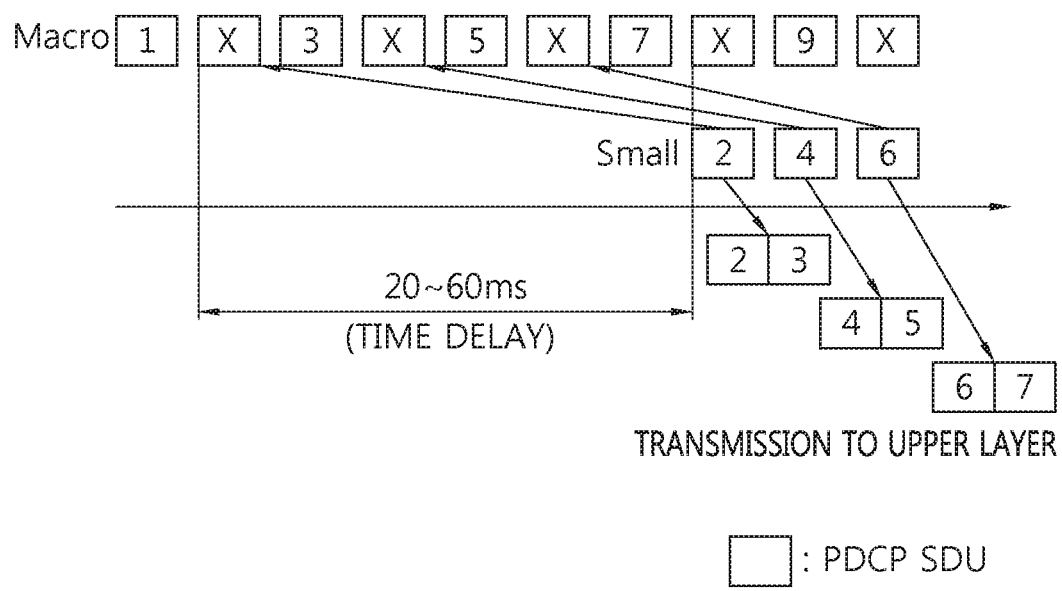
FIG. 13 illustrates an example of sequential upper layer transmission depending on the PDCP sequence number (SN) in the PDCP entity of the UE.

FIG. 13 illustrates an example of sequential upper layer transmission depending on the PDCP sequence number (SN) in the PDCP entity of the UE. FIG. 13 illustrates a case in which PDCH SDUs having odd PDCP SNs are received by the UE through the macro base station and PDCP SDUs having even PDCP SNs are received by the UE through the small base station.

Referring to FIG. 13, since there is no previous or missed PDCP SN, PDCP SDU #1 may be transmitted to the upper layer. However, in the case of PDCP SDU #3, at the time when a PDCP PDU corresponding to the PDCP SDU #3 is received by the PDCP entity of the UE, a PDCP PDU corresponding to PDCP PDU #2 may not be received. Accordingly, in this case, an in-sequence timer for PDCP PDU #3 is driven. Similarly in the cases of PDCP SDU #5 and PDCP SDU #7, the in-sequence timer for each of PDCP SDU #5 and PDCP SDU #7 is driven.

When PDCP SDU #2 is present in the PDCP entity of the UE (that is, the PDCP PDU corresponding to PDCP SDU #2) before the in-sequence timer for PDCP SDU #3 has expired, the UE confirms that PDCP SDU #2 and PDCP SDU #3 are sequentially present after PDCP SDU #1 and sequentially delivers PDCP SDU #2 and PDCP SDU #3 to the upper layer. In this case, the in-sequence timer for PDCP SDU #3 expires or ends. However, even in this case, PDCP SDU #4 has not yet reached and an in-sequence timer for PDCP SDU #5 and an in-sequence timer for PDCP SDU #7 still operate.

Thereafter, when PDCP SDU #4 is present in the PDCP entity of the UE before the in-sequence timer for PDCP SDU #5 has expired, the UE transmits PDCP SDU #4 and PDCP SDU #5 to the upper layer and the in-sequence timer for PDCP SDU #5 expires or ends.

Further, when PDCP SDU #6 is present in the PDCP entity of the UE before an in-sequence timer for PDCP SDU #7 has expired, the UE transmits PDCP SDU #6 and PDCP SDU #7 to the upper layer and the in-sequence timer for PDCP SDU #7 expires or ends.

In the above description, the in-sequence timer duration may be established when the PDCP entity is configured in the macro base station. The in-sequence timer duration may be established by considering a transmission delay time of the backhaul between the macro base station and the small base station.

The in-sequence timer may be transmitted from the macro base station to the UE through the RRC message. In detail, for example, the in-sequence timer may be included in a PDCP configuration which is an RRC information element as the following syntax.

TABLE 1

```
-- ASN1START
PDCP-Config ::=              SEQUENCE {
    discardTimer                 ENUMERATED {
                                     ms50, ms100, ms150, ms300, ms500,
                                     ms750, ms1500, infinity
    }                                                OPTIONAL,       -- Cond Setup
    inseqTimer                   ENUMERATED {
                                     ms20, ms30, ms40, ms50, ms60,
    }                                                OPTIONAL,       -- Cond Setup
    rlc-AM                       SEQUENCE {
        statusReportRequired         BOOLEAN
    }                                                OPTIONAL,       -- Cond Rlc-AM
    rlc-UM                       SEQUENCE {
        pdcp-SN-Size                 ENUMERATED {len7bits, len12bits}
    }                                                OPTIONAL,       -- Cond Rlc-UM
    headerCompression            CHOICE {
        notUsed                      NULL,
        rohc                         SEQUENCE {
            maxCID                       INTEGER (1..16383)       DEFAULT 15,
            profiles                     SEQUENCE {
                profile0x0001                BOOLEAN,
                profile0x0002                BOOLEAN,
                profile0x0003                BOOLEAN,
                profile0x0004                BOOLEAN,
                profile0x0006                BOOLEAN,
                profile0x0101                BOOLEAN,
                profile0x0102                BOOLEAN,
                profile0x0103                BOOLEAN,
                profile0x0104                BOOLEAN
            },
            ...
        }
    },
    ....
    [[ rn-IntegrityProtection-r10    ENUMERATED {enabled}    OPTIONAL       -- Cond RN
    ]],
    [[ pdcp-SN-Size-v11x0            ENUMERATED {len15bits}  OPTIONAL       -- Cond Rlc-AM2
    ]]
}
-- ASN1STOP
```

Referring to Table 1, the PDCP configuration information element includes an inseqTimer field. The inseqTimer field indicates an in-sequence timer value. The inseqTimer field is driven when the PDCP SDU corresponding to the PDCP PDU received by the PDCP entity is not sequentially formed in the order of the PDCP SN. That is, when a PDCP SDU of PDCP SN #n−1 smaller than PDCP SN #n of the PDCP SDU is missed, the in-sequence timer may be driven with respect to the PDCP SDU of the corresponding PDCP SN #n.

Figure 14:
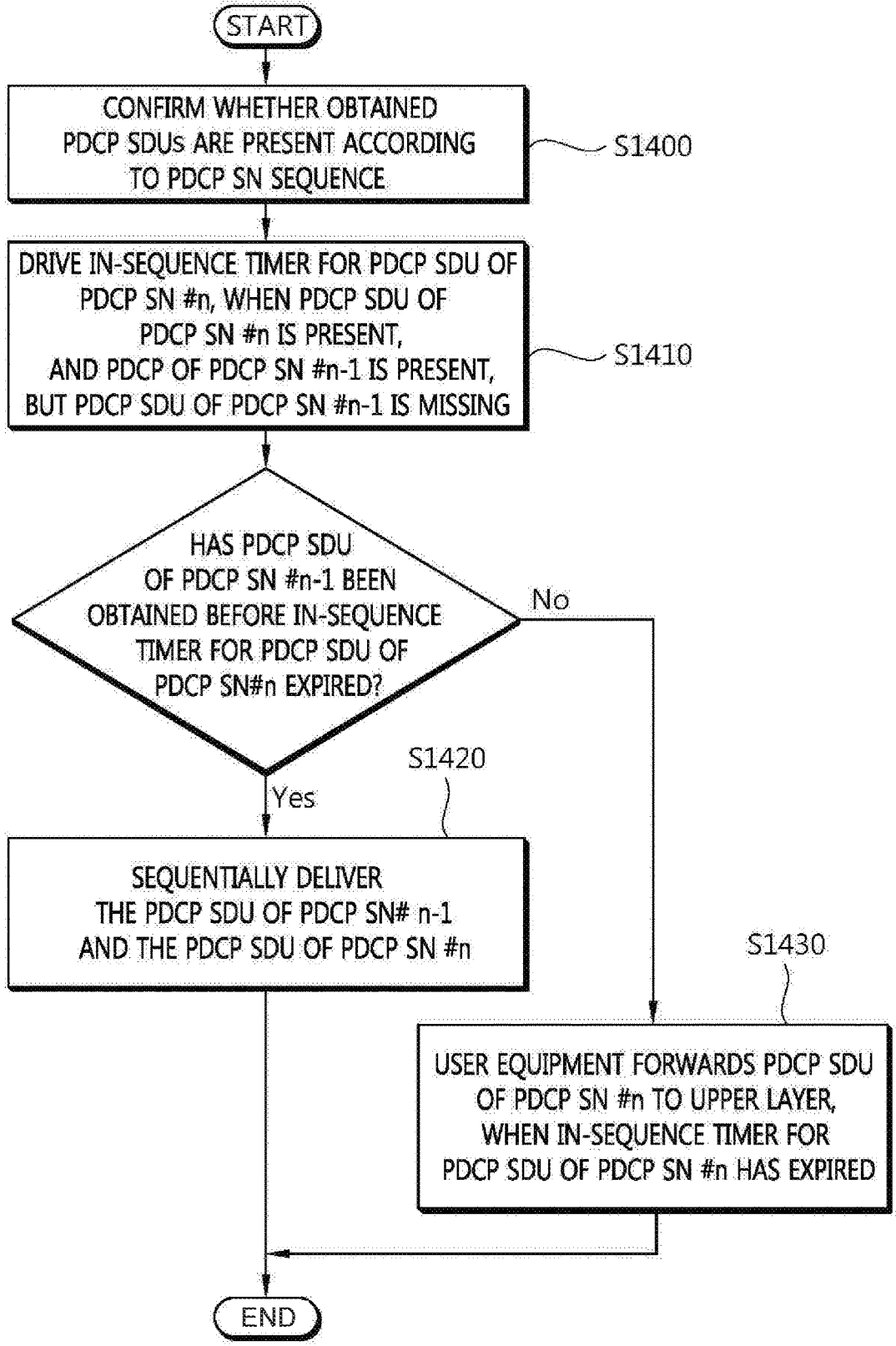
FIG. 14 illustrates a method for sequentially delivering the PDCP SDU, which is performed by the UE considering the multi-flows according to an embodiment of the present invention.

FIG. 14 illustrates a method for sequentially delivering the PDCP SDU, which is performed by the UE considering the multi-flows according to an embodiment of the present invention.

Referring to FIG. 14, the UE confirms whether acquired PDCP SDUs are sequentially present in the order of the PDCP SN (S1400).

When the PDCP SDU of PDCP SN #n is present, but the PDCP SDU of PDCP SN #n−1 is missed, the in-sequence timer for the PDCP SDU of the PDCP SN #n is driven (S1410).

When the UE acquires the PDCP SDU of PDCP SN #n−1 before the in-sequence timer for the PDCP SDU of PDCP SN #n has expired, the UE sequentially delivers the PDCP SDU of PDCP SN #n−1 and the PDCP SDU of PDCP SN #n (S1420).

When the in-sequence timer the PDCP SDU of PDCP SN #n has expired in S1410, the UE delivers the PDCP SDU of PDCP SN #n to the upper layer (S1430). The reason is that this case is not the case by the receiving delay of the transmission path of the PDCP PDU by the dual connectivity but a case in which the PDCP SDU of PDCP SN #n−1 is discarded by the PDCP discard timer.

Figure 15:
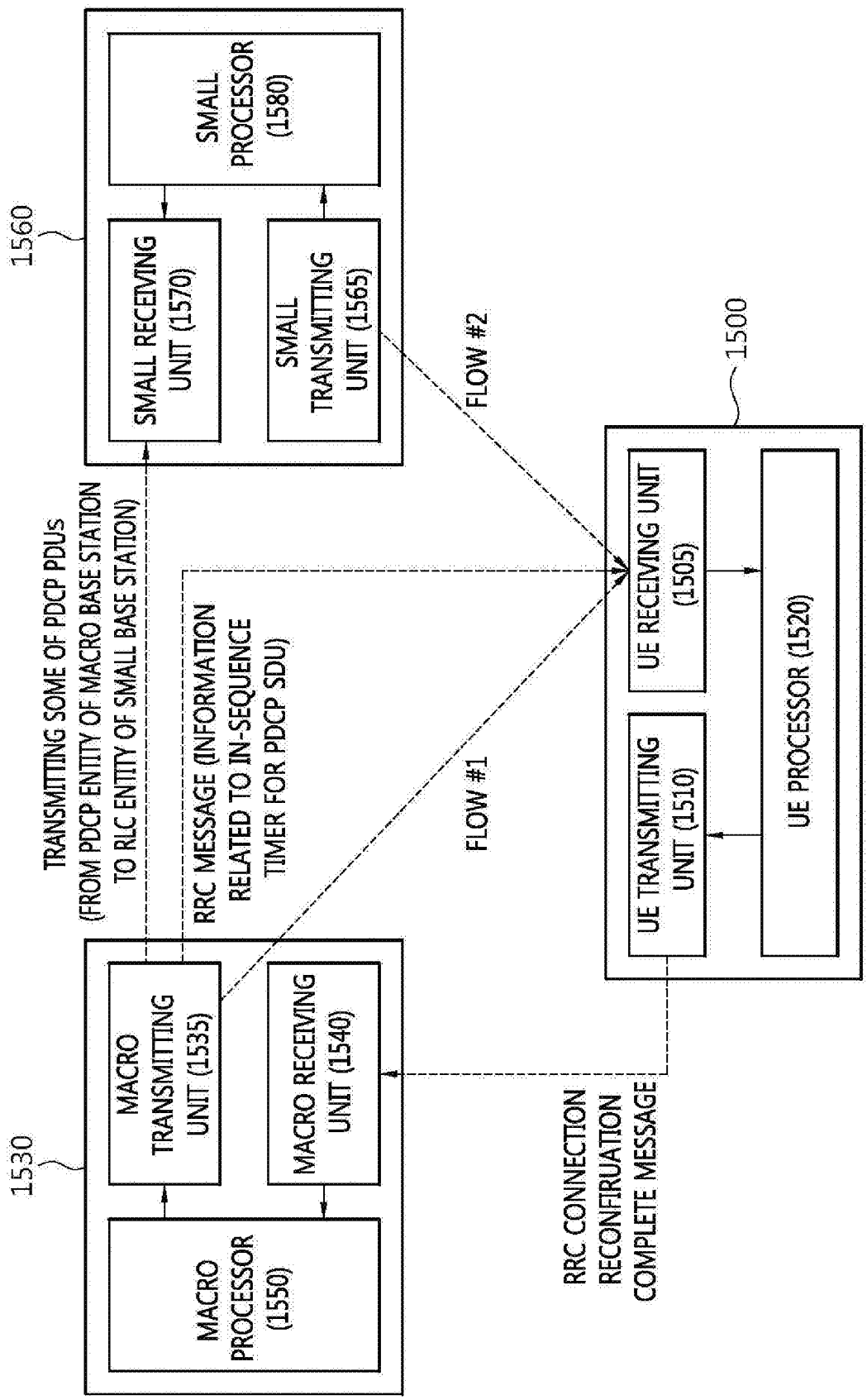
FIG. 15 is a block diagram of a macro base station, a small base station, and UE according to an embodiment of the present invention.

FIG. 15 is a block diagram of a macro base station, a small base station, and UE according to an embodiment of the present invention.

Referring to FIG. 15, UE 1500 according to the embodiment of the present invention may configure dual connectivity with a macro eNB 1530 and a small eNB 1560. Further, the UE 1500, the macro eNB 1530, and the small eNB 1560 according to the present invention support the aforementioned multi flow.

The macro eNB 1530 includes a macro transmitting unit 1535, a macro receiving unit 1540, and a macro processor 1550.

The macro receiving unit 1540 receives a packet for one EPS bearer from the S-GW. The macro processor 1550 controls the PDCP entity of the macro eNB 1530 to generate PDCP PDUs. The macro processor 1550 distributes the PDCP PDUs according to a predetermined reference to transfer (alternatively, transmit) some of the PDCP PDUs to the RLC entity of the macro receiving unit 1540 and transmit some of the PDCP PDUs to the UE through the macro transmitting unit 1535. The macro processor 1550 transfers (alternatively, transmits) others to the RLC entity of the small eNB 1560 through the macro transmitting unit 1535. In this case, the PDCP SDUs corresponding to the PDCP PDUs may be divided and indicated to the SN.

Further, the macro processor 1550 generates information on an in-sequence timer for the PDCP SDU and transmits the information to the UE through the macro transmitting unit 1535. The information on the in-sequence timer may be defined every PDCP SDU. The macro transmitting unit 1535 may transmit the information on the in-sequence timer including the RRC message (for example, a RRC connection reconfiguration message) to the UE 1500.

The small eNB 1560 includes a small transmitting unit 1565, a small receiving unit 1570, and a small processor 1580.

The small receiving unit 1570 receives the PDCP PDU from the small eNB 1560.

The small processor 1580 processes the PDCP PDU by controlling the RLC entity, the MAC entity, and the PHY layer of the small eNB 1560 and transmits the processed PDCP PDU to the UE through the small transmitting unit 1565.

The UE 1500 includes a UE receiving unit 1505, a UE transmitting unit 1510, and a UE processor 1520. The UE processor 1520 performs a function and a control required to implement the aforementioned features of the present invention.

The UE receiving unit 1505 receives the information on the in-sequence timer from the macro eNB 1530. The information on the in-sequence timer may be defined every PDCP SDU and the information on the in-sequence timer is included in the RRC message (for example, the RRC connection reconfiguration message) to be received by the UE receiving unit 1505. In this case, the UE transmitting unit 1510 may transmit an RRC connection reconfiguration complete message to the macro eNB 1530.

Further, the UE receiving unit 1505 receives data for the respective PDCP PDUs from the macro eNB 1530 and the small eNB 1560.

The UE processor 1505 analyzes the data and controls the PHY layer(s), the MAC entity(s), the RLC entity(s), and the PDCP entity to acquire the PDCP SDU.

The UE processor 1505 verifies the PDCP SN of the PDCP SDU acquired from the PDCP entity and verifies whether there is a PDCP SDU of omitted PDCP SN #n−1. When there is the PDCP SDU of the omitted PDCP SN #n−1, the UE processor 1505 operates the in-sequence timer with respect to a PDCP SDU of the next PDCP SN #n of the omitted PDCP SN #n−1.

When the UE processor 1505 acquires the PDCP SDU of the omitted PDCP SN #n−1 before the in-sequence timer is completed, the UE processor 1505 performs in-sequence delivery of the PDCP SDU of the PDCP SN #n−1 and the PDCP SDU of the PDCP SN #n to the upper layer.

When the in-sequence timer is completed, the UE processor 1505 transfers the PDCP SDU of the PDCP SN #n to the upper layer without waiting until the SDU of the omitted PDCP SN #n−1 is acquired.

The above description is illustrative purpose only and various modifications and transformations become apparent to those skilled in the art within a scope of an essential characteristic of the present invention. Accordingly, the various embodiments disclosed herein are not intended to limit the technical spirit but describe with the true scope and spirit being indicated by the following claims. The scope of the present invention may be interpreted by the appended claims and the technical spirit in the equivalent range are intended to be embraced by the invention.

What is claimed is:

1. A method for user equipment receiving multi-flow data with respect to one evolved packet system (EPS) bearer through a macro base station (macro eNB) and a small base station (small eNB) serving a single cell in a wireless communication system supporting dual connectivity, the method comprising:
   receiving packet data convergence protocol (PDCP) packet data units (PDUs) through the macro base station and the small base station;
   obtaining PDCP service data units (SDUs) corresponding to the PDCP PDUs; and
   receiving from the macro base station information related to an in-sequence timer for the PDCP SDUs through a radio resource control (RRC) message,
   wherein the PDCP SDUs are indicated by a predefined PDCP sequence number (SN),
   wherein the RRC message includes a PDCP-configuration information element (IE), and
   the PDCP-configuration IE includes a field indicating a value of the in-sequence timer.

2. The method of claim 1, further comprising:
   confirming the respective PDCP SNs of the obtained PDCP SDUs and performing in sequence delivery of the PDCP SDUs to an upper layer from a PDCP entity according to the PDCP SN.

3. The method of claim 2, further comprising:
   confirming whether there is a PDCP SDU of PDCP SN #n−1 which is missed notwithstanding obtaining a PDCP SDU of PDCP SN #n; and
   driving the in-sequence timer with respect to the PDCP SDU of PDCP SN #n when there is the PDCP SDU of PDCP SN #n−1 which is missed.

4. The method of claim 3, wherein before the in-sequence timer for the PDCP SDU of PDCP SN #n has expired, when the PDCP SDU of PDCP SN #n−1 is obtained, the PDCP SDU of PDCP SN #n−1 and the PDCP SDU of PDCP SN #n are delivered to the upper layer according to the order of the PDCP SN.

5. The method of claim 2, wherein when the in-sequence timer for the PDCP SDU of PDCP SN #n has expired, the PDCP SDU of PDCP SN #n is delivered to the upper layer of the PDCP entity even though there is no PDCP SDU of PDCP SN #n−1.

6. A method for transmitting multi-flow data for one evolved packet system (EPS) bearer to user equipment (UE) from a macro base station (macro eNB) and a small base station (small eNB) serving a single cell in a wireless communication system supporting dual connectivity, the method comprising:
   generating packet data convergence protocol (PDCP) packet data units (PDUs) in a PDCP entity with respect to packets received by the macro base station according to a PDCP sequence number (SN) of a PDCP service data unit (SDU);
   distributing the PDCP PDUs to radio link control (RLC) entities of the macro base station and RLC entities of the small base station according to a predetermined rule and transmitting the distributed PDCP PDUs to the UE; and
   transmitting to the UE a radio resource control (RRC) message including information related to an in-sequence timer for the PDCP SDUs;
   wherein the RRC message includes a PDCP-configuration information element (IE), and
   the PDCP-configuration IE includes a field indicating a value of the in-sequence timer.

7. The method of claim 6, wherein the RRC message including the information related to the in-sequence timer is an RRC connection reconfiguration message.

8. A user equipment (UE) for receiving multi-flow data with respect to one evolved packet system (EPS) bearer through a macro base station (macro eNB) and a small base station (small eNB) serving a single cell in a wireless communication system supporting dual connectivity, the UE comprising:
- a receiving unit receiving packet data convergence protocol (PDCP) packet data units (PDUs) through the macro base station and the small base station and receiving from the macro base station information related to in-sequence timer for the PDCP SDUs through a radio resource control (RRC) message; and
- a processor obtaining PDCP service data units (SDUs) corresponding to the PDCP PDUs,
- wherein the PDCP SDUs are indicated by a predefined PDCP sequence number (SN),
- wherein the RRC message includes a PDCP-configuration information element (IE), and
- the processor determines the value of in-sequence timer based on the PDCP-configuration IE.

9. The UE of claim 8, wherein the processor confirms the processor confirms the respective PDCP SNs of the obtained PDCP SDUs and performs in-sequence delivery of the PDCP SDUs to an upper layer from a PDCP entity according to the PDCP SN.

10. The UE of claim 9, wherein the processor confirms whether there is a PDCP SDU of PDCP SN #n−1 which is missed notwithstanding obtaining a PDCP SDU of PDCP SN #n; and
- drives the in-sequence timer with respect to the PDCP SDU of PDCP SN #n when there is the PDCP SDU of PDCP SN #n−1 which is missed.

11. The UE of claim 10, wherein the processor delivers, when the in-sequence timer for the PDCP SDU of PDCP SN #n has expired, the PDCP SDU of PDCP SN #n to the upper layer of the PDCP entity even though there is no PDCP SDU of PDCP SN #n−1.

12. The UE of claim 10, wherein the processor delivers, before the in-sequence timer for the PDCP SDU of PDCP SN #n has expired, when the PDCP SDU of PDCP SN #n−1 is obtained, the PDCP SDU of PDCP SN #n−1 and the PDCP SDU of PDCP SN #n to the upper layer according to the order of the PDCP SN.

* * * * *